Aug. 3, 1954　　　　　　　L. L. BOYER　　　　　　2,685,376
AUTOMATIC PNEUMATIC COOLER DOOR
Filed Sept. 26, 1952　　　　　　　　　　　　　　　　2 Sheets-Sheet 1
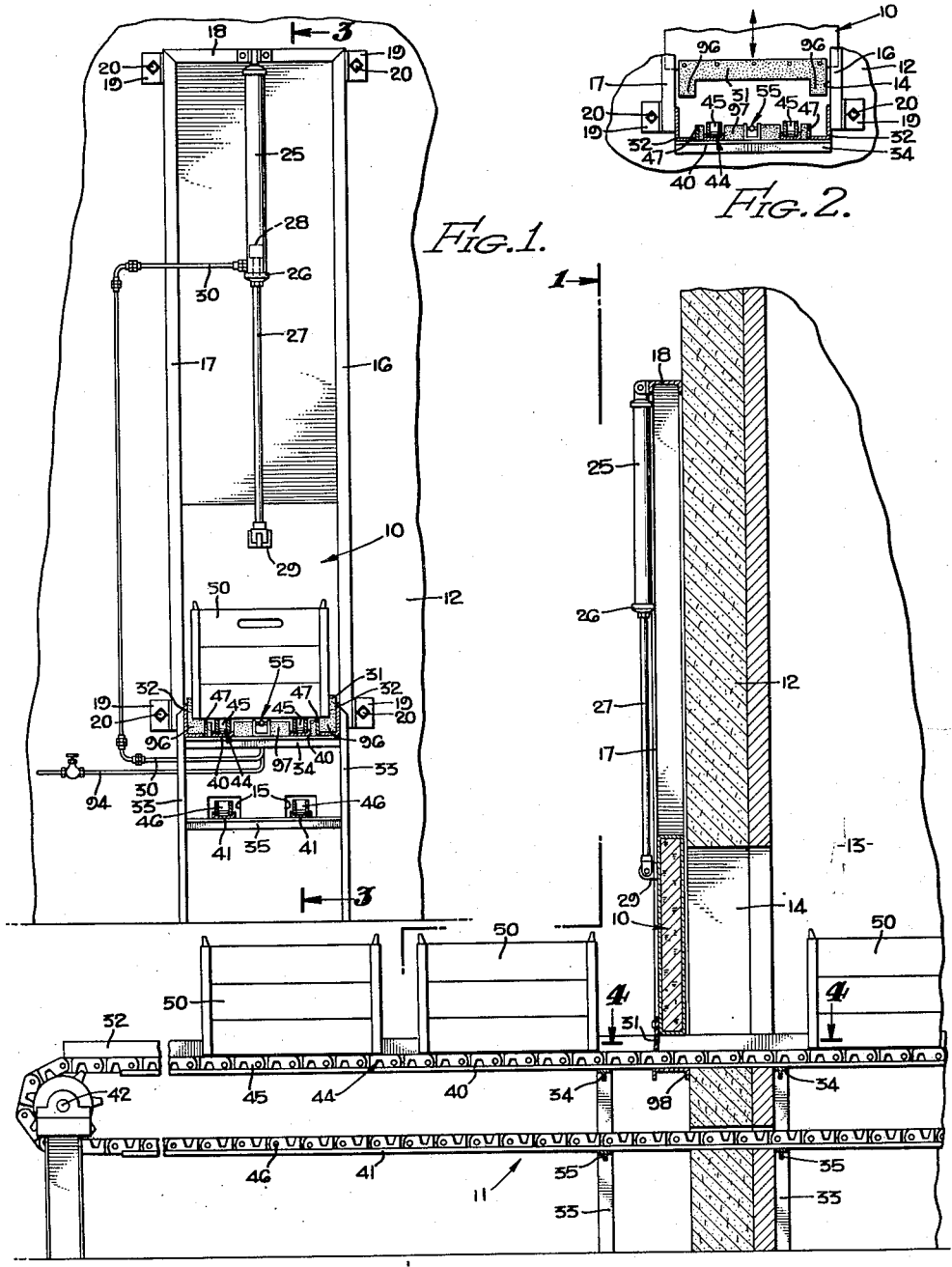

Aug. 3, 1954      L. L. BOYER      2,685,376
AUTOMATIC PNEUMATIC COOLER DOOR
Filed Sept. 26, 1952      2 Sheets-Sheet 2
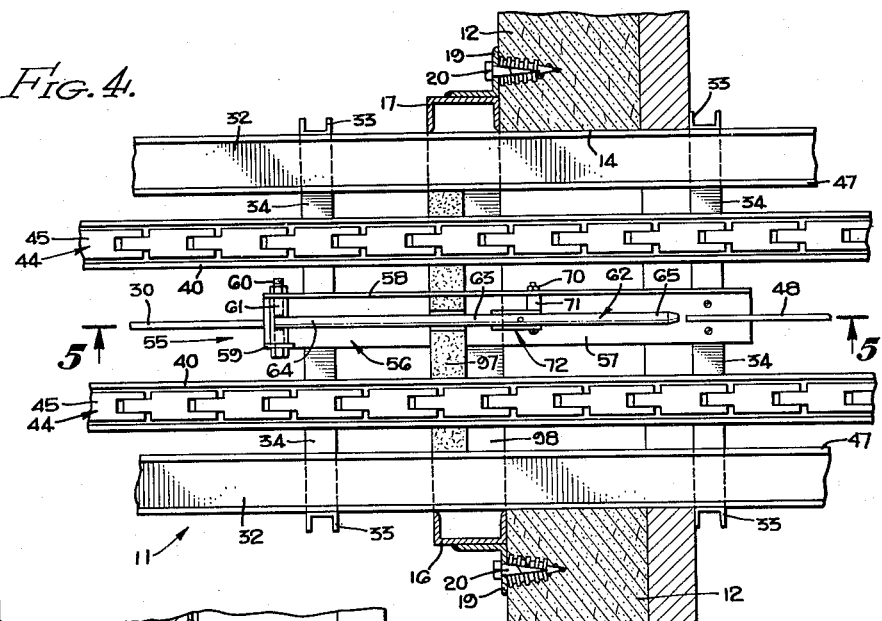
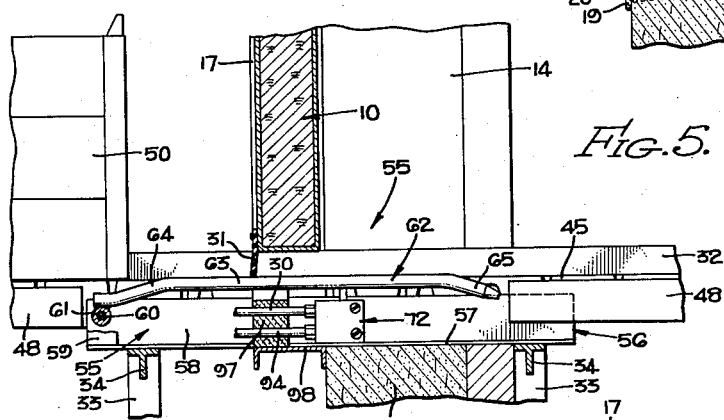
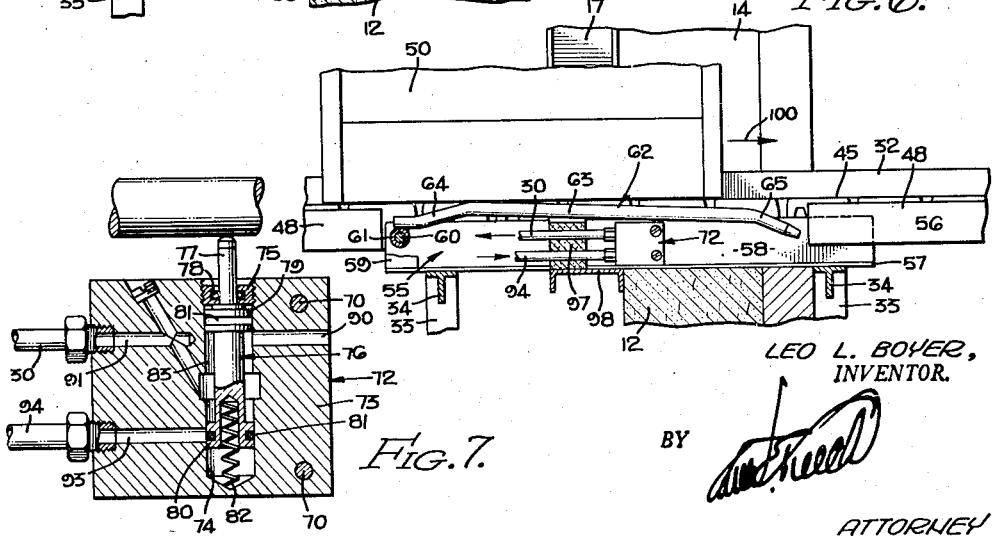
LEO L. BOYER, INVENTOR.
BY
ATTORNEY Patented Aug. 3, 1954

2,685,376

UNITED STATES PATENT OFFICE 2,685,376

AUTOMATIC PNEUMATIC COOLER DOOR

Leo L. Boyer, Los Angeles, Calif., assignor to Knudsen Creamery Co. of California, Los Angeles, Calif., a corporation of California Application September 26, 1952, Serial No. 311,757

2 Claims. (Cl. 214—16)

This invention relates to commercial cold storage as required in fresh food processing industries.

Cold storage for fresh food products such as fruit, vegetable and dairy products is provided in large storage rooms, the products being packed in fruit boxes, vegetable crates or milk cases and carried into and from the cold storage room on a conveyor. To prevent unnecessary loss of refrigeration various means have been provided for automatically closing the door through which containers of food products are delivered into and from a cold storage room, but none of these has been satisfactory.

It is an object of the present invention to provide a novel means of automatically closing a door to cover a doorway through which cases of food are carried into or from a cold storage room which will operate with a relatively high degree of efficiency in preventing the transfer of air through said doorway when the latter is not occupied by cases of food being transported therethrough by said conveyor.

It is another object of this invention to provide a reversible conveyor adapted to travel in opposite directions through a doorway in a wall of a cold storage room so that said conveyor may be operated alternately for conveying cases of food products into said storage room or out of said storage room and to provide said conveyor with means responsive to the travel of a food case thereon and approaching said doorway in either direction to cause said doorway to be uncovered by a door normally closing the same and to cause said door to return to closing position immediately following the passage of said container through said doorway, providing that said container is not closely followed by another container on said conveyor.

The manner of accomplishing the foregoing objects as well as further objects and advantages will be made manifest in the following description taken in connection with the accompanying drawings in which Fig. 1 is a front elevational view of a section of a storage room wall in which a doorway is provided, this view illustrating a power conveyor for conveying milk cases through said doorway, said conveyor being shown in section taken on the line 1—1 of Fig. 3. This view also illustrates a preferred embodiment of the present invention for automatically closing said doorway or opening the same to permit milk cases to pass through said doorway on said conveyor either when traveling into or outwardly from said storage room.

Fig. 2 is a diagrammatic fragmentary view of a portion of Fig. 1 showing the door of the invention in partially closed position.

Fig. 3 is a vertical sectional view taken on the line 3—3 of Fig. 1 and showing the invention with the door closed by virtue of a gap of a certain length occurring between adjacent cases transported on said conveyor.

Fig. 4 is an enlarged detail horizontal sectional view taken on the line 4—4 of Fig. 3 and illustrating the novel case-responsive valve trigger of the invention.

Fig. 5 is a vertical sectional view taken on the line 5—5 of Fig. 4 and illustrating said trigger when the latter is free from depression by a case on the conveyor so as to cause the door of the invention to be lowered into closing relation with the doorway controlled thereby.

Fig. 6 is a view similar to Fig. 5 showing said control trigger depressed by a milk case traveling in a left-hand direction along said conveyor through said doorway and thereby causing said door to be lifted out of said doorway to permit said milk case to proceed along said conveyor into the storage room.

Fig. 7 is an enlarged detailed sectional view of the control valve of the invention and is taken on the line 5—5 of Fig. 4 this view showing the valve in neutral or non-actuated position under the circumstances shown in Fig. 5 where said trigger is not depressed by a case and said valve is thus caused to control said door to lower the latter into closing relation with said doorway.

Referring specifically to the drawings, the preferred embodiment of the invention disclosed therein is seen to be embodied in an automatic cold storage room door 10 and a power conveyor 11 which are associated with a wall 12 of a cold storage room 13 and with a doorway 14 formed in said wall. The wall 12 also has two small openings 15, the purpose of which will be explained later.

The door 10 is guided for vertically sliding movement by channel members 16 and 17 which are joined at their upper ends by a cross member 18 and which have angle brackets 19, the latter being secured to the wall 12 by expansion lag screws 20.

Supported at its upper end on the cross member 18 is an air cylinder 25 having an apertured head 26 at its lower end in which a piston rod 27 slides. Provided on the upper end of rod 27 is a piston 28 the lower end of this rod being pivoted on a bracket 29 which is fastened on the door 10. Connecting at the lower end of cylinder 25 is an air supply line 30.

The lower end of the door 10 is provided with a flexible flap 31 which is shaped as shown in Fig. 2, and the purpose of which will be made clear hereinafter.

The conveyor 11 includes longitudinal side frame members 32, these being supported at intervals on vertical legs 33 which are connected by upper and lower T-section cross bars 34 and 35. The longitudinal frame members 32 snugly rest in the lower corners of the doorway 14 and the upper faces of the cross bars 34 are on the same level as the lower edge of said doorway.

The frame members 32 are welded to the legs 33 and cross bars 34 and channel chain guides 40 rest on and are welded to cross bars 34 (Figs. 1, 3 and 4). Channel chain guides 41 also rest on and are welded to cross bars 35 and extend through openings 15 in the wall 12.

The conveyor 11 is provided with shafts 42 at its opposite ends, these shafts having sprockets 43 which lie in the same vertical planes with the chain guides 40 and 41 and have endless chains 44 trained thereabout so that the upper flights 45 of said chains travel along and are guided by guides 40 while the lower flights 46 of said chains rest upon and travel along guides 41.

Welded to the cross bars and resting thereon are full-length slide rails 47 and 48 the upper edges of which are disposed just below the level of the edges of upper flights 45 of chains 44, these slide rails serving to prevent cases 50 from rocking laterally while they are riding on these upper flights.

Mounted on the longitudinal axis of the conveyor 11 so as to extend approximately an equal distance in the opposite direction from the plane of the door 10 is a trigger means 55. This means includes an angle iron base 56 which extends entirely through the doorway 14 and is secured as by welding near its opposite ends to the nearest cross bars 34 on opposite sides of said doorway. The base 56 has a horizontal flange 57 and a vertical flange 58 extending throughout the length of said base. Provided at one end of said base to extend upwardly from the free edge of the flange 57 in opposed relation with flange 58 is a short flange 59. Extending through aligned apertures in flanges 58 and 59 is a bolt 60, a sleeve 61 being rotatably mounted on said bolt between said flanges.

The trigger means 55 also includes a trigger 62 which constitutes a rod, a central portion 63 of which is straight and end portions 64 and 65 of which are inclined slightly downwardly from straight portion 63. The extremity of the inclined end portion 64 of the trigger 62 is welded to the sleeve 61 (Figs. 4, 5 and 6) so as to pivotally mount the trigger 62 on the axis of bolt 60.

Mounted on vertical flange 58 by bolts 70 and a spacer block 71 is a valve 72. This valve includes a body 73 (Fig. 7) having a valve bore 74 the mouth of which is internally threaded to receive an apertured plug 75 thereby trapping a valve element 76 therein. A valve stem 77 extends axially upwardly through the aperture in the plug 75 which is recessed to receive an O-ring 78. The valve element 76 has upper and lower pistons 79 and 80 each of which is externally apertured and provided with an O-ring 81. The inner end of the valve element 76 is centrally apertured to receive a coiled spring 82 which constantly urges the element 76 and stem 77 into the upward positions in which they are shown in Fig. 7. Between the pistons 79 and 80 the element 76 is of substantially smaller diameter than the bore 74 thereby creating a free passage space 83 between these pistons wherever they are located in said bore.

Provided in the body 73 to connect the outside atmosphere with the inter-piston space 83 when the element 76 is in its upper position is an exhaust conduit 90. The body 73 also has a conduit passage 91 which connects with said inter-piston space 83 through an internal counterbore 92. The body 73 also has a conduit 93 which connects with the bore 74 at a point where it is covered by the piston 80 when the valve element 76 is in its upper position as shown in Fig. 6. Air line 30 connects with conduit 91 in the body 73 and conduit 93 connects with an air supply line 94 the other end of which connects with a suitable supply of air under super-atmospheric pressure.

The valve 72 is centrally located in the conveyor 11 so that the valve stem 77 lies directly under the trigger 62 and maintains the latter in its upward position with the straight section 63 thereof disposed horizontally as shown in Fig. 4 whenever this trigger is not being depressed by a case 50 riding thereover.

As shown in Fig. 2 the rubber flap 31 has tabs 96 extending downwardly from its opposite ends, these tabs being adapted to fit into the channels formed by the frame members 32 and vertical case guides 47 so as to close these channels to the passage of air therealong beneath door 10 when the latter is closed.

Also provided is a plaster wall 97 (Fig. 2) which is mounted on a transverse channel 98 the latter being supported at its opopsite ends by the frame members 32, the wall 97 substantially filling the spaces between guides 47, upper chain flights 45 and the space in the plane of flap 31 immediately adjacent the trigger 62 and lying below the level of the upper surfaces of chain flights 45. The wall 97 thus co-operates with the flexible flap 31 on the door 10 when the latter is closed to substantially shut off the flow of air through the doorway 14.

*Operation*

When the door 10 is in its downward or closed position as shown in Figs. 1 and 5, the valve 72 is positioned as shown in Fig. 5. Here we see that the valve element 76 is disposed in its uppermost position in which it is pressed by the spring 82 and in which the stem 77 supports the trigger 62 in its upward position as shown in Fig. 5. The supply of air under super-atmospheric pressure with which the pipe 94 connects is shut off by the piston 80 covering the conduit 93 where this enters the bore 74. On the other hand the upward position of the valve element 76 uncovers the exhaust conduit 90 causing this to communicate through the inter-piston space 83 with the conduit 91 with which the pipe line 30 connects and which communicates with the lower end of the door actuating cylinder 25. This connection of the lower end of the cylinder 25 with the atmosphere whenever valve element 76 is in its upper position is what causes the door 10 to descend whenever the trigger 62 is free from being depressed by a case and is thus elevated to its upper position by spring 82 as shown in Figs. 5 and 7.

With the conveyor 11 traveling in the direction of arrow 100 and with a case 50 carried thereon and approaching the door 10 as shown in Fig. 5, the front lower corner of the case 50 engages the inclined end portion 64 of the trigger 62 so as to rock the trigger 62 downwardly. This depresses valve element 76, further compressing spring 82 and concurrently lowering the pistons 79 and 80 so that these pistons respectively close the exhaust conduit 90 and open the pressure conduit 93 to communication with the inter-piston space 83. This causes air to flow under substantial pressure from the conduit 93 through the space 83 and the conduit 91 to the pipe line 30 and from this into the lower end of cylinder 25 thereby withdrawing the piston rod 27 into the cylinder 25 and sliding the door 10 upwardly along the guides 16 and 17 and opening doorway 14. The displacing of the door 10 from the path of the approaching case 50 as above described occurs rapidly so that the door does not interfere with the continuous movement of this case along the conveyor 11 and through the doorway 14. The case 50 thus depresses the trigger 62 and remains in contact with the trigger and continues to hold the valve element 76 depressed, which of course, retains the door 10 in its elevated position until this case travels out of contact with the inclined end portion 65 of said trigger.

If there are a series of cases traveling end-to-end along the conveyor 11 as shown in Fig. 3, each case depressing the trigger 62 and thus causing the door 10 to be held in its upper position does not pass from over the trigger 62 before the next following case has been advanced into depressing relation with said trigger.

Until there is a substantial break in the series of cases traveling on the conveyor the door 10 will thus remain elevated. Whenever such a break occurs of sufficient length to permit the trigger 62 to rise to its upper position as shown in Figs. 5 and 7, the door 10, of course, shifts downwardly closing the doorway 14.

When the conveyor 11 is run reversely to the direction indicated by the arrow 100 in Fig. 6, a similar control of the door 10 is exercised by cases 50 traveling on said conveyor, but in this instance the shifting of the valve element 76 downwardly to effect the lifting of the door 10 as this case approaches on the conveyor results from the front end of the case 50 engaging the inclined end portion 65 of trigger 62 so as to swing the latter downwardly about the axis of bolt 60 on which this trigger is mounted. Although the trigger 62 is rotated a lesser amount about said axis by the initial contact of a case 50 with inclined end portion 65 of said trigger than it is by a case traveling in the opposite direction and engaging the end portion 64 of said trigger, nevertheless the engagement of such a case with end portion 65 of said trigger depresses the valve element 76 a sufficient distance to cause a similar operation of the door 10 as is caused by a case traveling in the direction of arrow 100 and engaging the inclined end portion 64 of said trigger.

It is thus clear that this invention provides a simple combination of a conveyor and an automatic cold storage door closure with a doorway for conveying cases of food products in either direction through said doorway and for automatically closing said doorway whenever there is an appreciable gap between adjacent cases being conveyed by said conveyor through said doorway.

The claims are:

1. In combination with a wall of a cold storage room having a doorway formed therein: a case conveyor extending through said doorway; a door for said doorway; means for slidably mounting said door to slide to and from covering relation with said doorway; power means for shifting said door to and from covering relation with said doorway; a trigger comprising a bar, a major middle portion of which is normally substantially horizontal and end portions of which have a slight inclination downwardly; means shiftably mounting said trigger so that said trigger extends substantially equal distances in opposite directions longitudinally from the plane of said door and is positioned on said conveyor with said horizontal portion disposed slightly above the level of the bottom surfaces of cases carried on said conveyor so that a case approaching said door on said conveyor in either direction will engage one of said downwardly inclined end portions of said trigger so as to shift the latter downwardly; a three-way air valve responsive to downward shifting of said trigger by a case traveling on said conveyor as aforesaid, said valve including spring means for returning said valve to neutral position and to lift said trigger to its normal position as aforesaid when said trigger is free from contact by a case on said conveyor; and pneumatic power means controlled by said valve to cause said power means to withdraw said door from covering relation with said doorway when said trigger is depressed as aforesaid and to return said door to covering relation with said doorway when said trigger is freed and allowed to rise to its normal position as aforesaid.

2. In combination with a wall of a cold storage room having a doorway formed therein: a case conveyor extending through said doorway; a door for said doorway; means for slidably mounting said door to slide to and from covering relation with said doorway; power means for shifting said door to and from covering relation with said doorway; a trigger comprising a bar, a major middle portion of which is normally substantially horizontal and end portions of which have a slight inclination downwardly; means pivotally mounting said trigger at one end thereof so that said trigger extends substantially equal distances in opposite directions longitudinally from the plane of said door and is positioned on said conveyor with said horizontal portion disposed slightly above the level of the bottom surfaces of cases carried on said conveyor so that a case approaching said door on said conveyor in either direction will engage one of said downwardly inclined end portions of said trigger so as to rock the latter downwardly about the axis of its mounting; a three-way air valve responsive to downward rocking of said trigger by a case traveling on said conveyor as aforesaid, said valve including spring means for returning said valve to neutral position and to lift said trigger to its normal position as aforesaid when said trigger is free from contact by a case on said conveyor; and pneumatic power means controlled by said valve to cause said power means to withdraw said door from covering relation with said doorway when said trigger is depressed as aforesaid and to return said door to covering relation with said doorway when said trigger is freed and allowed to rise to its normal position as aforesaid.

References Cited in the file of this patent

UNITED STATES PATENTS

| Number | Name | Date |
|---|---|---|
| 1,044,837 | Wenzel | Nov. 19, 1912 |
| 1,216,345 | Mirau | Feb. 20, 1917 |
| 1,692,851 | Mojonnier | Nov. 27, 1928 |
| 2,313,095 | Schneider | Mar. 9, 1943 |